United States Patent
Sugihara et al.

(10) Patent No.: US 10,865,694 B2
(45) Date of Patent: Dec. 15, 2020

(54) COOLING APPARATUS OF VEHICLE

(71) Applicant: TOYOTA JIDOSHA KABUSHIKI KAISHA, Toyota (JP)

(72) Inventors: Hiroyuki Sugihara, Sunto-gun (JP); Tomohiro Shinagawa, Sunto-gun (JP); Yuji Miyoshi, Susono (JP); Takuya Hirai, Susono (JP); Keisuke Tokai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/154,851

(22) Filed: Oct. 9, 2018

(65) Prior Publication Data
US 2019/0234289 A1 Aug. 1, 2019

(30) Foreign Application Priority Data
Jan. 26, 2018 (JP) .................. 2018-011275

(51) Int. Cl.
*F01P 7/14* (2006.01)
*H01M 10/667* (2014.01)
(Continued)

(52) U.S. Cl.
CPC .............. *F01P 7/14* (2013.01); *B60K 6/22* (2013.01); *B60K 11/02* (2013.01); *B60L 58/26* (2019.02); *F01P 3/20* (2013.01); *H01M 10/613* (2015.04); *H01M 10/625* (2015.04); *H01M 10/6568* (2015.04); *H01M 10/667* (2015.04);
(Continued)

(58) Field of Classification Search
CPC .. F01P 7/14; F01P 3/20; F01P 2023/08; F01P 2025/30; F01P 2050/24; F01P 2060/00; H01M 10/667; H01M 10/613; H01M 10/625; H01M 10/6568; H01M 2220/20; B60L 58/26; B60K 6/22; B60K 11/02; B60Y 2200/92; B60Y 2306/05
See application file for complete search history.

(56) References Cited

U.S. PATENT DOCUMENTS 5,251,588 A * 10/1993 Tsujii .................. B60K 6/46
  123/142.5 R
2013/0226380 A1  8/2013 Ando et al.

FOREIGN PATENT DOCUMENTS

CN     2894051 Y  *  4/2007
JP     5-131848        5/1993
(Continued)

*Primary Examiner* — Jacob M Amick
*Assistant Examiner* — Charles Brauch
(74) *Attorney, Agent, or Firm* — Oblon, McClelland, Maier & Neustadt, L.L.P.

(57) ABSTRACT

A cooling apparatus of a vehicle of the invention comprises an engine cooling system, a device cooling system, and a connection apparatus configured to connect an engine circulation circuit of the engine cooling system and a device circulation circuit of the device cooling system to each other such that heat exchanging liquid cooled by a device radiator of the device cooling system, is supplied to an engine passage formed in an internal combustion engine without flowing through a device passage formed in the device including at least one of a motor of the vehicle, a battery for storing electric power to be supplied to the motor, and a power control unit for controlling a supply of the electric power from the battery to the motor.

8 Claims, 8 Drawing Sheets

(51) Int. Cl.
  *H01M 10/613* (2014.01)
  *H01M 10/625* (2014.01)
  *H01M 10/6568* (2014.01)
  *B60L 58/26* (2019.01)
  *B60K 6/22* (2007.10)
  *B60K 11/02* (2006.01)
  *F01P 3/20* (2006.01)

(52) U.S. Cl.
  CPC ....... *B60Y 2200/92* (2013.01); *B60Y 2306/05* (2013.01); *F01P 2023/08* (2013.01); *F01P 2025/30* (2013.01); *F01P 2050/24* (2013.01); *F01P 2060/00* (2013.01); *H01M 2220/20* (2013.01)

(56) References Cited

FOREIGN PATENT DOCUMENTS

| | | |
|---|---|---|
| JP | 11-22466 | 1/1999 |
| JP | 2011-98628 | 5/2011 |
| JP | 2013-35504 | 2/2013 |
| JP | 2013-177026 | 9/2013 |

\* cited by examiner

COOLING APPARATUS OF VEHICLE

BACKGROUND

Field

The invention relates to a cooling apparatus of a vehicle, in particular, a cooling apparatus for cooling an internal combustion engine of a vehicle.

Description of the Related Art

There is known a hybrid vehicle which is driven by an internal combustion engine and an electric motor. The hybrid vehicle includes a cooling apparatus for circulating cooling water to cool the internal combustion engine, the electric motor, a battery for storing electric power to be supplied to the electric motor, and a power control unit for controlling an electric power supply from the battery to the electric motor. The cooling apparatus prevents temperatures of the internal combustion engine, the electric motor, the battery, and the power control unit from increasing excessively.

In general, a temperature of a hybrid device including the electric motor, the battery, and the power control unit should be maintained at a temperature lower than the temperature of the internal combustion engine. There is known a hybrid vehicle equipped with a cooling apparatus including two radiators, that is, an engine radiator for cooling the cooling water for cooling the internal combustion engine and a device radiator for cooling the cooling water for cooling the hybrid device (for example, see JP 2013-35504 A).

In general, the engine and device radiators are provided in an engine compartment provided at a front portion of the vehicle. A space of the engine compartment is limited. Therefore, the engine radiator should be small in order to provide the engine and device radiators in the engine compartment. When the engine radiator is small, an ability of the engine radiator for cooling the cooling water is low. Thus, the cooling water may not coot the internal combustion engine sufficiently, in particular, when the internal combustion engine outputs large power, thereby generating a large amount of heat.

SUMMARY

The invention has been made for solving the above-mentioned problems. An object of the invention is to provide a cooling apparatus of the vehicle which includes the engine radiator and the device radiator and can cool the internal combustion engine sufficiently.

A cooling apparatus of a vehicle (100) according to the invention comprises an engine cooling system (10), a device cooling system (30), and a connection apparatus (50). The engine cooling system (10) includes an engine circulation circuit (11), an engine pump (13), and an engine radiator (12). A heat exchanging liquid for cooling an internal combustion engine (110) of the vehicle (100) flows in the engine circulation circuit (11). The engine pump (13) is provided in the engine circulation circuit (11). The engine radiator (12) is provided in the engine circulation circuit (11) for cooling the heat exchanging liquid. The engine circulation circuit (11) includes an engine passage (15) formed in the internal combustion engine (110). The device cooling system (30) includes a device circulation circuit (31), a device pump (33), and a device radiator (32). The heat exchanging liquid for cooling a device (180) of the vehicle (100) flows in the device circulation circuit (31). The device pump (33) is provided in the device circulation circuit (31). The device radiator (32) is provided in the device circulation circuit (31) for cooling the heat exchanging liquid. The device circulation circuit (31) includes a device passage (35) formed in the device (180). The device (180) includes at least one of a motor (111, 112) of the vehicle (100), a battery (120) for storing electric power to be supplied to the motor (111, 112), and a power control unit (130) for controlling a supply of the electric power from the battery (120) to the motor (111, 112). The connection apparatus (50) connects the engine circulation circuit (11) and the device circulation circuit (31) to each other. The connection apparatus (50) is configured to connect the engine circulation circuit (11) and the device circulation circuit (31) to each other such that the heat exchanging liquid cooled by the device radiator (32) is supplied to the engine passage (15) without flowing through the device passage (35).

The cooling apparatus according to the invention can supply the heat exchanging liquid, which has flowed through the device radiator, to the engine passage without flowing the heat exchanging liquid through the device passage by connecting the engine circulation circuit and the device circulation circuit to each other. Therefore, the heat exchanging liquid having a large cooling performance increased by the engine and device radiators can be supplied to the engine passage. Thus, the internal combustion engine can be cooled sufficiently by connecting the engine circulation circuit and the device circulation circuit to each other when the heat exchanging liquid having the large cooling performance is requested to be supplied to the engine passage for cooling the internal combustion engine.

According to an aspect of the invention, the device circulation circuit (31) may include a device radiator passage (36), a first device circulation passage (37), and a second device circulation passage (38). The device radiator passage (36) is formed in the device radiator (32). The heat exchanging liquid flows through the device radiator passage (36). The first device circulation passage (37) connects a first opening of the device passage (35) to a first opening of the device radiator passage (36). The second device circulation passage (38) connects a second opening of the device radiator passage (36) to a second opening of the device passage (35). In this case, the connection apparatus (50) may include a first connection passage (51), a second connection passage (52), and a control valve (65). The first connection passage (51) connects the engine circulation circuit (11) to the first device circulation passage (37). The second connection passage (52) connects the engine circulation circuit (11) to the second device circulation passage (38). The control valve (65) shuts off a flow of the heat exchanging liquid between the device passage (35) and the device radiator passage (36) through at least one of the first device circulation passage (37) and the second device circulation passage (38).

According to another aspect of the invention, the connection apparatus (50) may be configured to connect the engine circulation circuit (11) and the device circulation circuit (31) to each other such that the heat exchanging liquid flows through the engine radiator (12) and the device radiator (32) in parallel. Thereby, the heat exchanging liquid having the larger cooling performance can be supplied to the engine passage, compared with when the engine circulation circuit and the device circulation circuit are connected to each other so as to flow the heat exchanging liquid through the engine radiator and the device radiator in sequence.

According to further another aspect of the invention, the cooling apparatus may further comprise an electronic control unit (90) for controlling activations of the engine pump (13), the device pump (33), and the connection apparatus (50). In this case, the electronic control unit (90) may be configured to activate the connection apparatus (50) to connect the engine circulation circuit (11) and the device circulation circuit (31) to each other and activate at least one of the engine pump (13) and the device pump (33) (see a process of a step 525 in FIG. 5) when a temperature (Teng) of the internal combustion engine (110) is higher than a predetermined upper limit engine temperature (Teng_upper) while the internal combustion engine (110) is requested to be cooled, and the device (180) is not requested to be cooled (see determinations "Yes" at steps 520 and 522 in FIG. 5).

The cooling performance of the heat exchanging liquid requested to be supplied to the engine passage when the internal combustion engine is requested to be cooled while the temperature of the internal combustion engine is higher than the predetermined upper limit engine temperature, is larger than the cooling performance of the heat exchanging liquid requested to be supplied to the engine passage when the internal combustion engine is requested to be cooled while the temperature of the internal combustion engine is equal to or lower than the predetermined upper limit engine temperature. The cooling apparatus according to this aspect connects the engine circulation circuit and the device circulation circuit to each other when the internal combustion engine is requested to be cooled, the device is not requested to be cooled, and the temperature of the internal combustion engine is higher than the predetermined upper limit engine temperature. Therefore, the heat exchanging liquid having the large cooling performance can be supplied to the engine passage. Thus, the internal combustion engine can be cooled sufficiently.

According to further another aspect of the invention, the electronic control unit (90) may be configured to activate the connection apparatus (50) to disconnect the engine circulation circuit (11) from the device circulation circuit (31) and activate the engine pump (13) and the device pump (33) (see a process of a step 510 in FIG. 5) when the internal combustion engine (110) is requested to be cooled, and the device (180) is requested to be cooled (see a determination "Yes" at a step 505 in FIG. 5).

Thereby, the heat exchanging liquid cooled by the device radiator is used only for cooling the device when the internal combustion engine is requested to be cooled, and the device is requested to be cooled. Thus, the device can be cooled sufficiently when the device is requested to be cooled.

According to further another aspect of the invention, the electronic control unit (90) may be configured to control the activation of an activated pump (13, 33) of the engine pump (13) and the device pump (33) so as to increase a flow rate (Reng, Rdev) of the heat exchanging liquid discharged from the activated pump (13, 33) (see processes of steps 710 and 715 in FIG. 7) when a temperature (Tw_eng_out) of the heat exchanging liquid flowing out from the engine passage (15) is higher than a predetermined engine flow-out liquid temperature (Tw_eng_th) while the electronic control unit (90) connects the engine circulation circuit (11) and the device circulation circuit (31) to each other and activates at least one of the engine pump (13) and the device pump (33) (see a determination "Yes" at a step 705 in FIG. 7).

According to further another aspect of the invention, the electronic control unit (90) may be configured to control the activation of the activated pump (13, 33) so as to increase the flow rate (Reng, Rdev) of the heat exchanging liquid flowing out from the activated pump (13, 33) (see processes of steps 725 and 730 in FIG. 7) when an engine flow-in liquid temperature (Tw_eng_in), which is a temperature of the heat exchanging liquid flowing into the engine passage (15), is lower than a predetermined engine flow in liquid temperature (Tw_eng_ref), and a difference (dTw_eng_in) of the engine flow-in liquid temperature (Tw_eng_in) with respect to the predetermined engine flow-in liquid temperature (Tw_eng_ref) is larger than a predetermined engine flow-in liquid temperature difference (dTw_eng_th) while the electronic control unit (90) connects the engine circulation circuit (11) and the device circulation circuit (31) to each other and activates at least one of the engine pump (13) and the device pump (33) (see a determination "Yes" at a step 720 in FIG. 7).

According to further another aspect of the invention, the electronic control unit (90) may be configured to control the activation of the activated pump (13, 33) so as to maintain the flow rate (Reng, Rdev) of the heat exchanging liquid flowing out from the activated pump (13, 33) (see processes of steps 735 and 740 in FIG. 7) when the engine flow-in liquid temperature (Tw_eng_in) is lower than the predetermined engine flow-in liquid temperature (Tw_eng_ref), and the difference (dTw_eng_in) of the engine flow-in liquid temperature (Tw_eng_in) with respect to the predetermined engine flow-in liquid temperature (Tw_eng_ref) is equal to or smaller than the predetermined engine flow-in liquid temperature difference (dTw_eng_th) while the electronic control unit (90) connects the engine circulation circuit (11) and the device circulation circuit (31) to each other and activates at least one of the engine pump (13) and the device pump (33) (see a determination "No" at the step 720 in FIG. 7).

According to further another aspect of the invention, the electronic control unit (90) may be configured to activate the connection apparatus (50) to connect the engine circulation circuit (11) and the device circulation circuit (31) to each other and activate both of the engine pump (13) and the device pump (33) (see the process of the step 525 in FIG. 5) when the temperature (Teng) of the internal combustion engine (110) is higher than the predetermined upper limit engine temperature (Teng_upper) while the internal combustion engine (110) is requested to be cooled, and the device (180) is not requested to be cooled (see the determinations "Yes" at the steps 520 and 522 in FIG. 5).

In this aspect, the electronic control unit (90) may be further configured to control the activations of the engine pump (13) and the device pump (33) so as to decrease a flow rate (Reng) of the heat exchanging liquid discharged from the engine pump (13) and increase a flow rate (Rdev) of the heat exchanging liquid discharged from the device pump (33) (see processes of steps 750 and 755 in FIG. 7) when an engine radiator flow-out liquid temperature (Tw_eng_rad) is higher than a device radiator flow-out liquid temperature (Tw_dev_rad), and a radiator flow-out liquid temperature difference is larger than a predetermined radiator flow-out liquid temperature difference (dTw_rad_th) while the electronic control unit (90) connects the engine circulation circuit (11) and the device circulation circuit (31) to each other and activates both of the engine pump (13) and the device pump (33) (see a determination "Yes" at a step 745 in FIG. 7). The engine radiator flow-out liquid temperature (Tw_eng_rad) is a temperature of the heat exchanging liquid flowing out from the engine radiator (12). The device radiator flow out liquid temperature (Tw_dev_rad) is a temperature of the heat exchanging liquid flowing out from the device radiator (33). The radiator flow-out liquid temperature difference is a difference (dTw_rad_out) of the engine radiator flow-out liquid temperature (Tw_eng_rad) with respect to the device radiator flow-out liquid temperature (Tw_dev_rad).

In this aspect, the electronic control unit (90) may be further configured to control the activations of the engine pump (13) and the device pump (33) so as to increase the flow rate (Reng) of the heat exchanging liquid discharged from the engine pump (13) and decrease the flow rate (Rdev) of the heat exchanging liquid discharged from the device pump (33) (see processes of steps 765 and 770 in FIG. 7) when the engine radiator flow-out liquid temperature (Tw_eng_rad) is higher than the device radiator flow-out liquid temperature (Tw_dev_rad), and the radiator flow-out liquid temperature difference (dTw_rad_out) is equal to or smaller than the predetermined radiator flow-out liquid temperature difference (dTw_rad_th) while the electronic control unit (90) connects the engine circulation circuit (11) and the device circulation circuit (31) to each other and activates both of the engine pump (13) and the device pump (33) (see a determination "Yes" at a step 760 in FIG. 7).

In this aspect, the electronic control unit (90) may be further configured to control the activations of the engine pump (13) and the device pump (33) so as to increase the flow rate (Reng) of the heat exchanging liquid discharged from the engine pump (13) and decrease the flow rate (Rdev) of the heat exchanging liquid discharged from the device pump (33) (see the processes of the steps 765 and 770 in FIG. 7) when the engine radiator flow-out liquid temperature (Tw_eng_rad) is equal to or lower than the device radiator flow-out liquid temperature (Tw_dev_rad) while the electronic control unit (90) connects the engine circulation circuit (11) and the device circulation circuit (31) to each other and activates both of the engine pump (13) and the device pump (33) (see the determination "Yes" at the step 760 in FIG. 7).

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
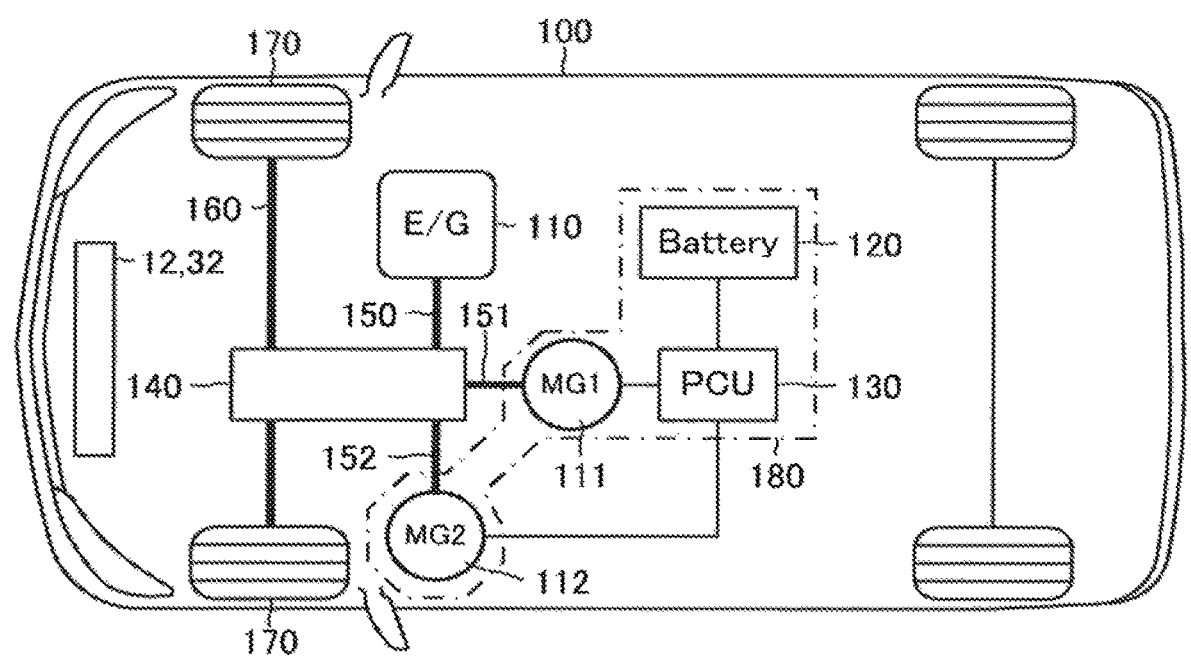
FIG. 1 is a view for showing a vehicle, to which a cooling apparatus according to an embodiment of the invention is applied.

Below, a cooling apparatus of a vehicle according to an embodiment of the invention will be described with reference to the drawings. Hereinafter, the cooling apparatus of the vehicle according to the embodiment will be referred to as "the embodiment apparatus". The embodiment apparatus is applied to a vehicle 100 shown in FIG. 1. An internal combustion engine 110, a first motor generator 111, a second motor generator 112, a rechargeable battery 120, a power control unit 130, and a driving force distribution mechanism 140 are mounted on the vehicle 100.

The vehicle 100 is a so-called hybrid vehicle which is driven by power output from the internal combustion engine 110, the first motor generator 111, and the second motor generator 112.

The vehicle 100, to which the embodiment apparatus is applied, may be a so-called plug-in hybrid vehicle in which the battery 120 can be charged by an outside power source.

The power control unit 130 includes an inverter, a boost converter, a DC/DC converter, and the like. Hereinafter, the power control unit 130 will be referred to as "the PCU 130".

The engine 110 outputs a torque (hereinafter, will be referred to as "engine torque") to the driving force distribution mechanism 140 through an output shaft ISO. The driving force distribution mechanism 140 distributes the engine torque into a torque for rotating an output shaft of the driving force distribution mechanism 140 and a torque for driving the first motor generator 111 as an electric generator at a predetermined distribution proportion (a predetermined distribution property).

The driving force distribution mechanism 140 transmits the engine torque and a torque input into the driving force distribution mechanism 140 from the second motor generator 112 to right and left driving wheels 170 through a wheel driving shaft 160.

The driving force distribution mechanism 140 is, for example, a known planetary gear mechanism described in JP 2013-77026 A, etc.

The first and second motor generators 111 and 112 are permanent magnet synchronous motors, respectively. The first and second motor generators 111 and 112 are electrically connected to the battery 120 via the inverter of the PCU 130.

The first motor generator 111 is operatively connected to the driving force distribution mechanism 140 via an input/output shaft 151. The first motor generator 111 is mainly used as an electric generator. When the first motor generator 111 is used as the electric generator, a rotation shaft of the first motor generator 111 is rotated by external forces such as a moving energy of the vehicle 100 input via the input/output shaft 151 and the engine torque, thereby generating electric power. The generated electric power is charged in the battery 120 via the inverter of the PCU 130.

The first motor generator 111 is also used as an electric motor. When the first motor generator 111 is used as the electric motor, the first motor generator 111 is driven by the electric power supplied thereto from the battery 120 via the inverter of the PCU 130. An output power of the first motor generator 111 is input into the driving force distribution mechanism 140 via the input/output shaft 151.

The second motor generator 112 is operatively connected to the driving force distribution mechanism 140 via an Input/output shaft 152. The second motor generator 112 is mainly used as an electric motor. When the second motor generator 112 is used as the electric motor, the second motor generator 112 is activated by the electric power supplied thereto from the battery 120 via the inverter of the PCU 130. The output power of the second motor generator 112 is input into the driving force distribution mechanism 140 via the input/output shaft 152.

The second motor generator 112 is also used as an electric generator. When the second motor generator 112 is used as the electric generator, a rotation shaft of the second motor generator 112 is rotated by the external forces such as the moving energy of the vehicle 100 input via the input/output shaft 152 and the engine torque, thereby generating electric power. The generated electric power is charged in the battery 120 via the inverter of the PCU 130.

Figure 2:
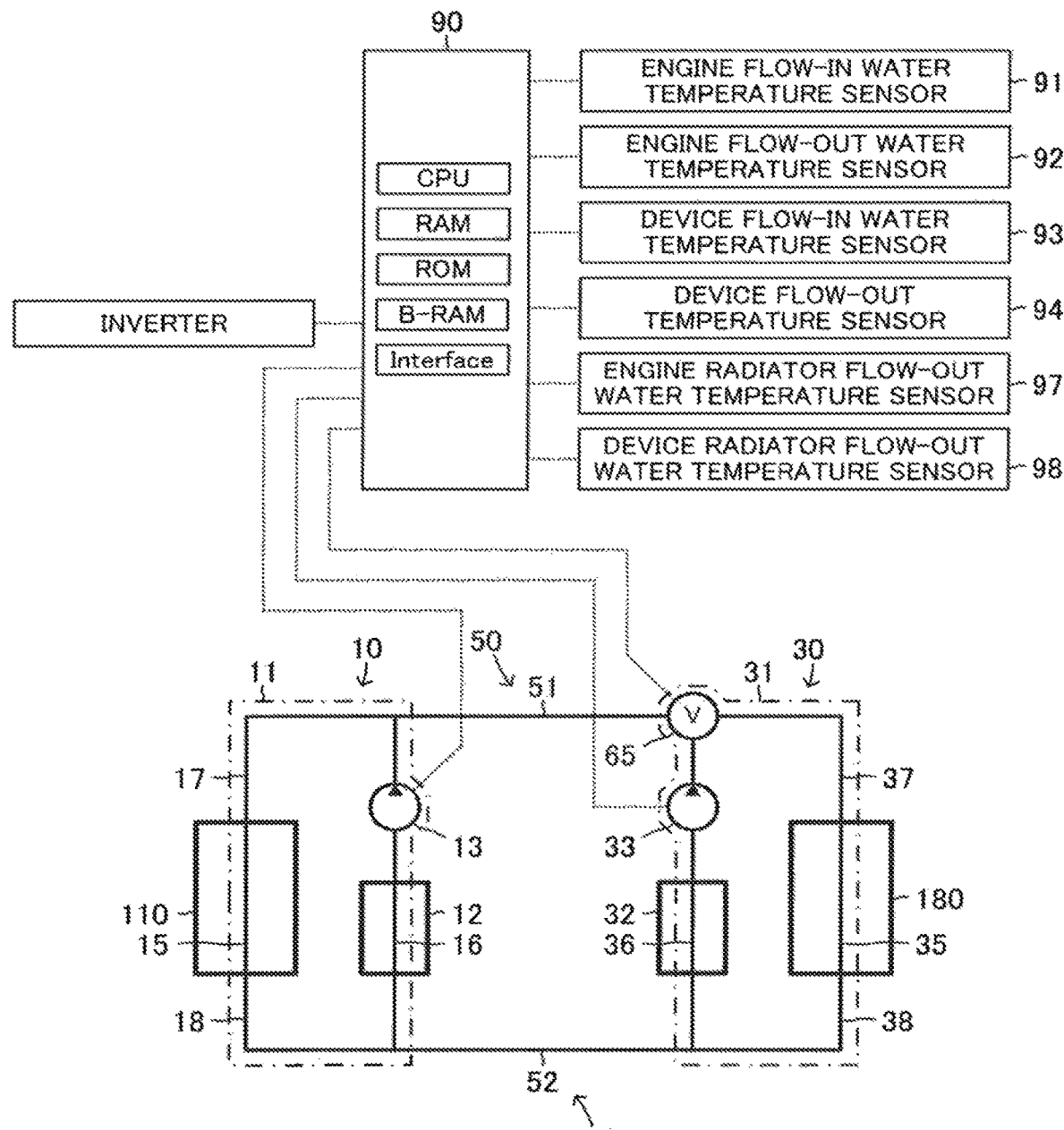
FIG. 2 is a view for showing the cooling apparatus of the vehicle according to the embodiment of the invention.

As shown in FIG. 2, the inverter of the PCU 130 is electrically connected to an ECU 90. The ECU 90 is an electronic control unit or an electronic control circuit including as a main component a microcomputer including a CPU, a ROM, a RAM, an interface and the like. The CPU realizes various functions described later by executing instructions or routines stored in a memory, i.e., the ROM.

An activation of the inverter of the PCU 130 is controlled by the ECU 90. The ECU 90 controls activations of the first motor generator 111 and the second motor generator 112 by controlling the activation of the inverter.

Cooling Apparatus

As shown in FIG. 2, the embodiment apparatus includes an engine cooling system 10, a device cooling system 30, and a connection apparatus 50.

Engine Cooling System

The engine cooling system 10 includes an engine circulation circuit 11, an engine radiator 12, and an engine pump 13.

When the engine 110 operates, the engine 110 generates heat. The engine 110 operates optimally when a temperature Teng of the engine 110 is maintained at a temperature within a predetermined engine temperature range Weng higher than zero. The engine circulation circuit 11 is a passage, through which a heat exchanging liquid flows to control the temperature Teng of the engine 110 at the temperature within the predetermined engine temperature range Weng. Hereinafter, the temperature Teng will be referred to as "the engine temperature Teng".

In this embodiment, the heat exchanging liquid is a heat exchanging water such as a so-called cooling water. Below, the embodiment apparatus will be described, using the heat exchanging water as the heat exchanging liquid.

The engine circulation circuit 11 is formed by an engine passage 15, an engine radiator passage 16, a first engine circulation passage 17, and a second engine circulation passage 18. The engine passage 15 is a passage formed in the engine 110. The engine radiator passage 16 is a passage formed in the engine radiator 12. The first engine circulation passage 17 is a passage which connects one of openings of the engine radiator passage 16 to one of openings of the engine passage 15. Hereinafter, the opening of the engine radiator passage 16 connected to the opening of the engine passage 15 via the first engine circulation passage 17, will be referred to as "the outlet of the engine radiator passage 16", and the opening of the engine passage 15 connected to the outlet of the engine radiator passage 16 via the first engine circulation passage 17, will be referred to as "the inlet of the engine passage 15". The second engine circulation passage 18 is a passage which connects the other opening of the engine passage 15 to the other opening of the engine radiator passage 16. Hereinafter, the opening of the engine passage 15 connected to the opening of the engine radiator passage 16 via the second engine circulation passage 18, will be referred to as "the outlet of the engine passage 15", and the opening of the engine radiator passage 16 connected to the outlet of the engine passage 15 via the second engine circulation passage 18, will be referred to as "the inlet of the engine radiator passage 16".

The engine pump 13 is provided in the first engine circulation passage 17 between a portion of the first engine circulation passage 17, to which a first connection passage 51 described later is connected, and the engine radiator 12.

As shown in FIG. 1, the engine radiator 12 is provided in an engine compartment provided in a front portion of the vehicle 100 such that the outside air flows through the engine radiator 12 while the vehicle 100 moves. The engine radiator 12 discharges heat of the heat exchanging water flowing through the engine radiator passage 16 to the outside air flowing through the engine radiator 12, thereby cooling the heat exchanging water.

Device Cooling System

As shown in FIG. 2, the device cooling system 30 includes a device circulation circuit 31, a device radiator 32, and a device pump 33.

When a hybrid device 180 including the first motor generator 111, the second motor generator 112, the battery 120, and the PCU 130 activates, the hybrid device 180 generates heat. The hybrid device 180 activates optimally when a temperature Tdev of the hybrid device 180 is maintained at a temperature within a predetermined temperature range higher than zero. The device circulation circuit 31 is a passage, through which the heat exchanging water flows to control the temperature Tdev of the hybrid device 180 at the temperature within a predetermined device temperature range Wdev. Hereinafter, the temperature Tdev of the hybrid device 180 will be referred to as "the device temperature Tdev".

The device circulation circuit 31 is formed by a device passage 35, a device radiator passage 36, a first device circulation passage 37, and a second device circulation passage 38. The device passage 35 is a passage formed in the hybrid device 180, The device radiator passage 36 is a passage formed in the device radiator 32. The first device circulation passage 37 is a passage which connects one of openings of the device radiator passage 36 to one of openings of the device passage 35. Hereinafter, the opening of the device radiator passage 36 connected to the opening of the device passage 35 via the first device circulation passage 37, will be referred to as "the outlet of the device radiator passage 36", and the opening of the device passage 35 connected to the outlet of the device radiator passage 36 via the first device circulation passage 37, will be referred to as "me inlet of the engine passage 35". The second device circulation passage 38 is a passage which connects the other opening of the device passage 35 to the other opening of the device radiator passage 36. Hereinafter, the opening of the device passage 35 connected to the opening of the device radiator passage 36 via the second device circulation passage 38, will be referred to as "the outlet of the device passage 35", and the opening of the device radiator passage 36 connected to the outlet of the device passage 35 via the second device circulation passage 38, will be referred to as "the inlet of the device radiator passage 36".

The device pump 33 is provided in the first device circulation passage 37 between a portion of the first device circulation passage 37, to which the first connection passage 51 described later is connected, and the device radiator 32.

As shown in FIG. 1, the device radiator 32 is provided in the engine compartment provided in the front portion of the vehicle 100 such that the outside air flows through the device radiator 32 while the vehicle 100 moves. The device radiator 32 discharges the heat of the heat exchanging water flowing through the device radiator passage 36 to the outside air flowing through the device radiator 32, thereby cooling the heat exchanging water.

Connection Apparatus

As shown in FIG. 2, the connection apparatus 50 includes a first connection passage 51, a second connection passage 52, and a control valve 65.

An end of the first connection passage 51 is connected to the first engine circulation passage 17 between the engine pump 13 and the engine 110. The other end of the first connection passage 51 is connected to the first device circulation passage 37 between the device pump 33 and the hybrid device 180.

The control valve 65 is provided in a portion, at which the first connection passage 51 is connected to the first device circulation passage 37.

An end of the second connection passage 52 is connected to the second engine circulation passage 18 between the engine 110 and the engine radiator 12. The other end of the second connection passage 52 is connected to the second device circulation passage 38 between the hybrid device 180 and the device radiator 32.

When the control valve 65 is set at a connection position, the first engine circulation passage 17 communicates with the first device circulation passage 37 through the first connection passage 51. On the other hand, when the control valve 65 is set at a disconnection position, the first engine circulation passage 17 is disconnected from the first device circulation passage 37.

Sensor

An engine flow-in water temperature sensor 91 is provided in the first engine circulation passage 17 between the inlet of the engine passage 15 and the portion of the first engine circulation passage 17, to which the first connection passage 51 is connected. The engine flow-in water temperature sensor 91 is electrically connected to the ECU 90. The engine flow-in water temperature sensor 91 detects a temperature of the heat exchanging water flowing into the engine passage 15 and outputs a signal representing the detected temperature to the ECU 90. The ECU 90 acquires the temperature of the heat exchanging water flowing into the engine passage 15 as an engine flow-in water temperature $Tw\_eng\_in$ on the basis of the signal of the engine flow-in water temperature sensor 91.

An engine flow-out water temperature sensor 92 is provided in the second engine circulation passage 18 between the outlet of the engine passage 15 and a portion of the second engine circulation passage 18, to which the second connection passage 52 is connected. The engine flow-out water temperature sensor 92 is electrically connected to the ECU 90. The engine flow-out water temperature sensor 92 detects a temperature of the heat exchanging water flowing out from the engine passage 15 and outputs a signal representing the detected temperature to the ECU 90, The ECU 90 acquires the temperature of the heat exchanging water flowing out from the engine passage 15 as an engine flow-out water temperature $Tw\_eng\_out$ on the basis of the signal of the engine flow-out water temperature sensor 92.

A device flow in water temperature sensor 93 is provided in the first device circulation passage 37 between the inlet of the device passage 35 and the portion of the first device circulation passage 37, to which the first connection passage 51 is connected. The device flow-in water temperature sensor 93 is electrically connected to the ECU 90. The device flow-in water temperature sensor 93 detects a temperature of the heat exchanging water flowing into the device passage 35 and outputs a signal representing the detected temperature to the ECU 90. The ECU 90 acquires the temperature of the heat exchanging water flowing into the device passage 35 as a device flow-in water temperature $Tw\_dev\_in$ on the basis of the signal of the device flow-in water temperature sensor 93.

A device flow-out water temperature sensor 94 is provided in the second device circulation passage 38 between the outlet of the device passage 35 and a portion of the second device circulation passage 38, to which the second connection passage 52 is connected. The device flow-out water temperature sensor 94 is electrically connected to the ECU 90. The device flow out water temperature sensor 94 detects a temperature of the heat exchanging water flowing out from the device passage 35 and outputs a signal representing the detected temperature to the ECU 90. The ECU 90 acquires the temperature of the heat exchanging water flowing out from the device passage 35 as a device flow-out water temperature $Tw\_dev\_out$ on the basis of the signal of the device flow-out water temperature sensor 94.

An engine radiator flow-out water temperature sensor 97 is provided in the first engine circulation passage 17 between the quiet of the engine radiator passage 16 and the engine pump 13. The engine radiator flow-out water temperature sensor 97 is electrically connected to the ECU 90. The engine radiator flow-out water temperature sensor 97 detects a temperature of the heat exchanging water flowing out from the engine radiator passage 16 and outputs a signal representing the detected temperature to the ECU 90. The ECU 90 acquires the temperature of the heat exchanging water flowing out from the engine radiator passage 16 as an engine radiator Row-out water temperature $Tw\_eng\_rad$ on the basis of the signal of the engine radiator flow-out water temperature sensor 97.

A device radiator flow-out water temperature sensor 98 is provided in the first device circulation passage 37 between the outlet of the device radiator passage 36 and the device pump 33. The device radiator flow-out water temperature sensor 98 is electrically connected to the ECU 90. The device radiator flow-out water temperature sensor 98 detects a temperature of the heat exchanging water flowing out from the device radiator passage 36 and outputs a signal representing the detected temperature to the ECU 90. The ECU 90 acquires the temperature of the heat exchanging water flowing out from the device radiator passage 36 as a device radiator flow-out water temperature $Tw\_dev\_rad$ on the basis of the signal of the device radiator flow-out water temperature sensor 98.

Summary of Operation of Embodiment Apparatus

Next a summary of an operation of the embodiment apparatus will be described.

Engine Cooling Request

As described above, the engine 110 operates optimally when the engine temperature Teng is maintained at the temperature within the predetermined engine temperature range Weng. In addition, the engine flow-out water temperature Tw_eng_out is a value correlating with the engine temperature Teng.

Accordingly, the embodiment apparatus determines that a process for cooling the engine 110 is requested to be executed when the engine flow-out water temperature Tw_eng_out is equal to or higher than a lower limit of a predetermined engine water temperature range Wtw_eng while the engine 110 operates. The predetermined engine water temperature range Wtw_eng is a range of the engine flow-out water temperature Tw_eng_out corresponding to the predetermined engine temperature range Weng. The predetermined engine water temperature range Wtw_eng is, for example, previously set on the basis of an experiment. Hereinafter, the lower limit of the predetermined engine water temperature range Wtw_eng will be referred to as "the engine warming end temperature Tw_eng_dan".

On the other hand, when the engine flow-out water temperature Tw_eng_out is tower than the engine warming end temperature Tw_eng_dan while the engine 110 operates, the embodiment apparatus determines that the process for cooling the engine 110 is not requested to be executed. Also, in this embodiment, when the engine 110 does not operate, the embodiment apparatus determines that the process for cooling the engine 110 is not requested to be executed.

Device Cooling Request

As described above, the hybrid device 180 activates optimally when the device temperature Tdev is maintained at the temperature within the predetermined device temperature range Wdev. In addition, the device flow-out water temperature Tw_dev_out is a value correlating with the device temperature Tdev.

Accordingly, the embodiment apparatus determines that a process for cooling the hybrid device 180 is requested to be executed when the device flow-out water temperature Tw_dev_out is equal to or higher than a lower limit of a predetermined device water temperature range Wtw_dev while the hybrid device 180 activates. The predetermined device water temperature range Wtw_dev is a range of the device flow-out water temperature Tw_dev_out corresponding to the predetermined device temperature range Wdev. The predetermined device water temperature range Wtw_dev is, for example, previously set on the basis of an experiment. Hereinafter, the lower limit of the predetermined device water temperature range Wtw_dev will be referred to as "the device warming end temperature Tw_dev_dan".

On the other hand, when the device flow-out water temperature Tw_dev_out is lower than the device warming end temperature Tw_dev_dan while the hybrid device 180 activates, the embodiment apparatus determines that the process for cooling the hybrid device 180 is not requested to be executed. Also, in this embodiment, when the hybrid device 180 does not activate, the embodiment apparatus determines that the process for cooling the hybrid device 180 is not requested to be executed.

In this embodiment, the device warming end temperature Tw_dev_dan is tower than the engine warming end temperature Tw_eng_dan.

Engine Cooling Requested and Device Cooling Requested

Figure 3:
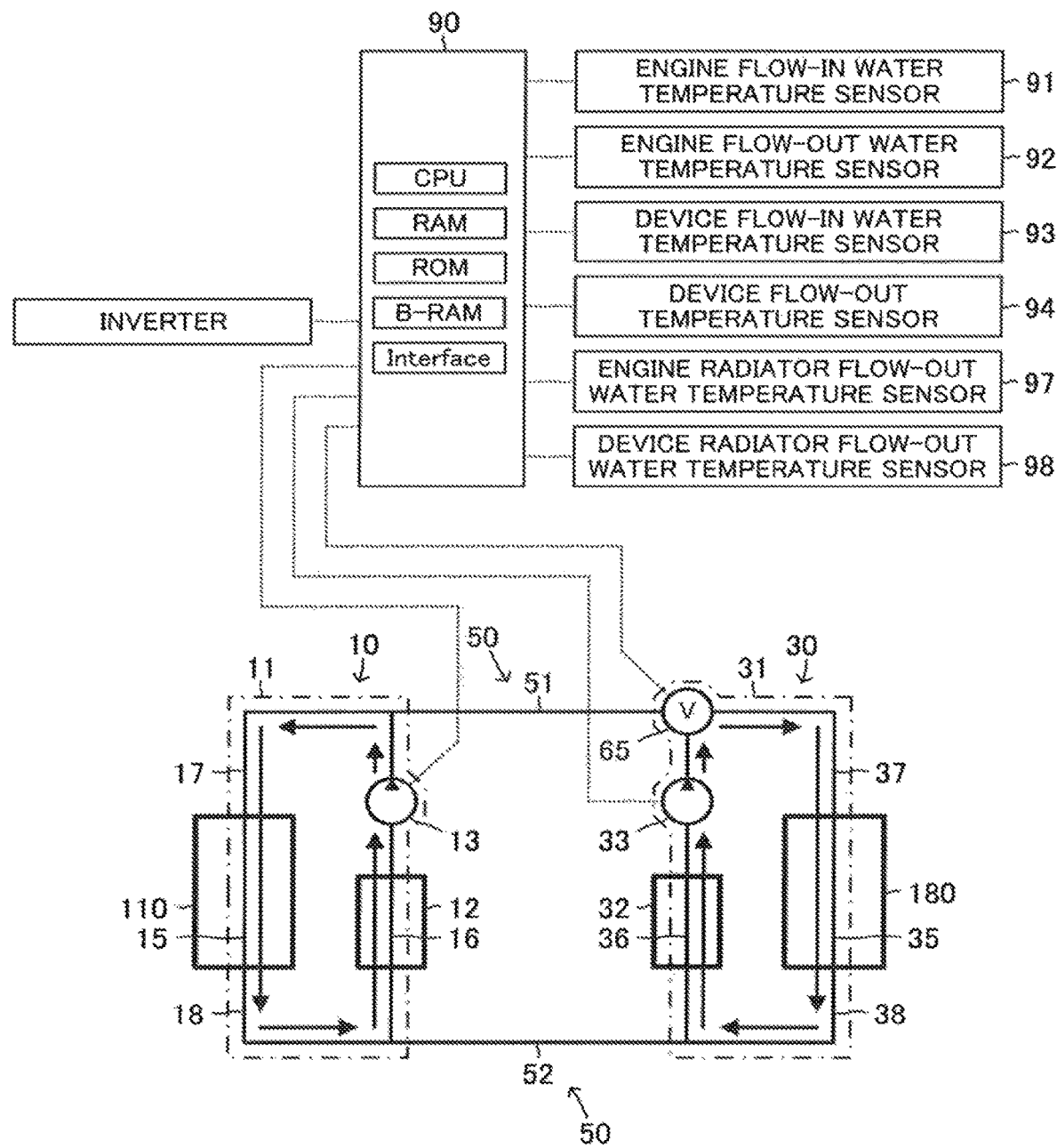
FIG. 3 is a view similar to FIG. 2 and which shows a flow of a heat exchanging water.

When the process for cooling the engine 110 and the process for cooling the hybrid device 180 are requested to be executed, the embodiment apparatus sets the control valve 65 at the disconnection position and activates the engine pump 13 and the device pump 33. Thereby, the heat exchanging water discharged from the engine pump 13 and the device pump 33 flows as shown by arrows in FIG. 3.

In particular, the heat exchanging water discharged from the engine pump 13 flows through the first engine circulation passage 17, the engine passage IS, the second engine circulation passage 18, the engine radiator passage 16, and the first engine circulation passage 17 in sequence and then, flows into the engine pump 13. Thereby, the heat exchanging water cooled by the engine radiator 12 is supplied to the engine passage 15. The engine 110 is cooled by the heat exchanging water supplied to the engine passage 15.

The heat exchanging water discharged from the device pump 33 flows through the first device circulation passage 37, the device passage 35, the second device circulation passage 38, the device radiator passage 36, and the first device circulation passage 37 in sequence and then. Rows into the device pump 33. Thereby the heat exchanging water cooled by the device radiator 32 is supplied to the device passage 35. The hybrid device 180 is cooled by the heat exchanging water supplied to the device passage 35.

Engine Cooling Requested and Device Cooling Not Requested

When the engine 110 is requested to output a large torque, the engine 110 generates a large amount of heat. Therefore, when the heat exchanging water to be supplied to the engine passage 15 is cooled only the engine radiator 12 while the engine 110 is requested to output the large torque, the heat exchanging water may not cool the engine 110 sufficiently to maintain the engine temperature Teng at a temperature equal to or lower than an upper limit of the predetermined engine temperature range Weng. Hereinafter, the upper limit of the predetermined engine temperature range Weng will be referred to as "the predetermined upper limit engine temperature Teng_upper".

When the first motor generator 111 and the second motor generator 112 do not activate, the device radiator 32 is not used for cooling the heat exchanging water to be supplied to the device passage 35. Therefore, when the device radiator 32 is used for cooling the heat exchanging water to be supplied to the engine passage 15 while the first motor generator 111 and the second motor generator 112 do not activate, an ability of the heat exchanging water supplied to the engine passage 15 of cooling the engine 110 increases.

Thereby, even when the heat exchanging water cooled only by the engine radiator 12 may not cool the engine 110 to maintain the engine temperature Teng at the temperature equal to or lower than the predetermined upper limit engine temperature Teng_upper, the engine 110 may be cooled sufficiently, and the engine temperature Teng may be maintained at the temperature equal to or lower than the predetermined upper limit engine temperature Teng_upper by supplying the heat exchanging water cooled by the engine radiator 12 and the device radiator 32.

Accordingly, the embedment apparatus determines whether an output power Peng requested for the engine 110 to output is larger than a predetermined output power Peng_th. Hereinafter, the output power Peng will be referred to as "the engine requested output power Peng".

In this embodiment, the predetermined output power Peng_th corresponds to the engine requested output power Peng, at which the engine temperature Teng cannot be controlled to the temperature equal to or lower than the predetermined upper limit engine temperature Teng_upper even by controlling a flow rate Veng or the heat exchanging water discharged from the engine pump 13 to a maximum flow rate Veng_max. The predetermined output power Peng_th is previously set, for example, by an experiment.

When the engine requested output power Peng is larger than the predetermined output power Peng_th, the embodiment apparatus determines that the engine temperature Teng is higher than the predetermined upper limit engine temperature Teng_upper. In this case, the embodiment apparatus determines whether the process for cooling the hybrid device 180 is requested to be executed. When the process for cooling the hybrid device 180 is not requested to be executed, the embodiment apparatus sets the control valve 65 at the connection position and activates the engine pump 13 and the device pump 33.

Figure 4:
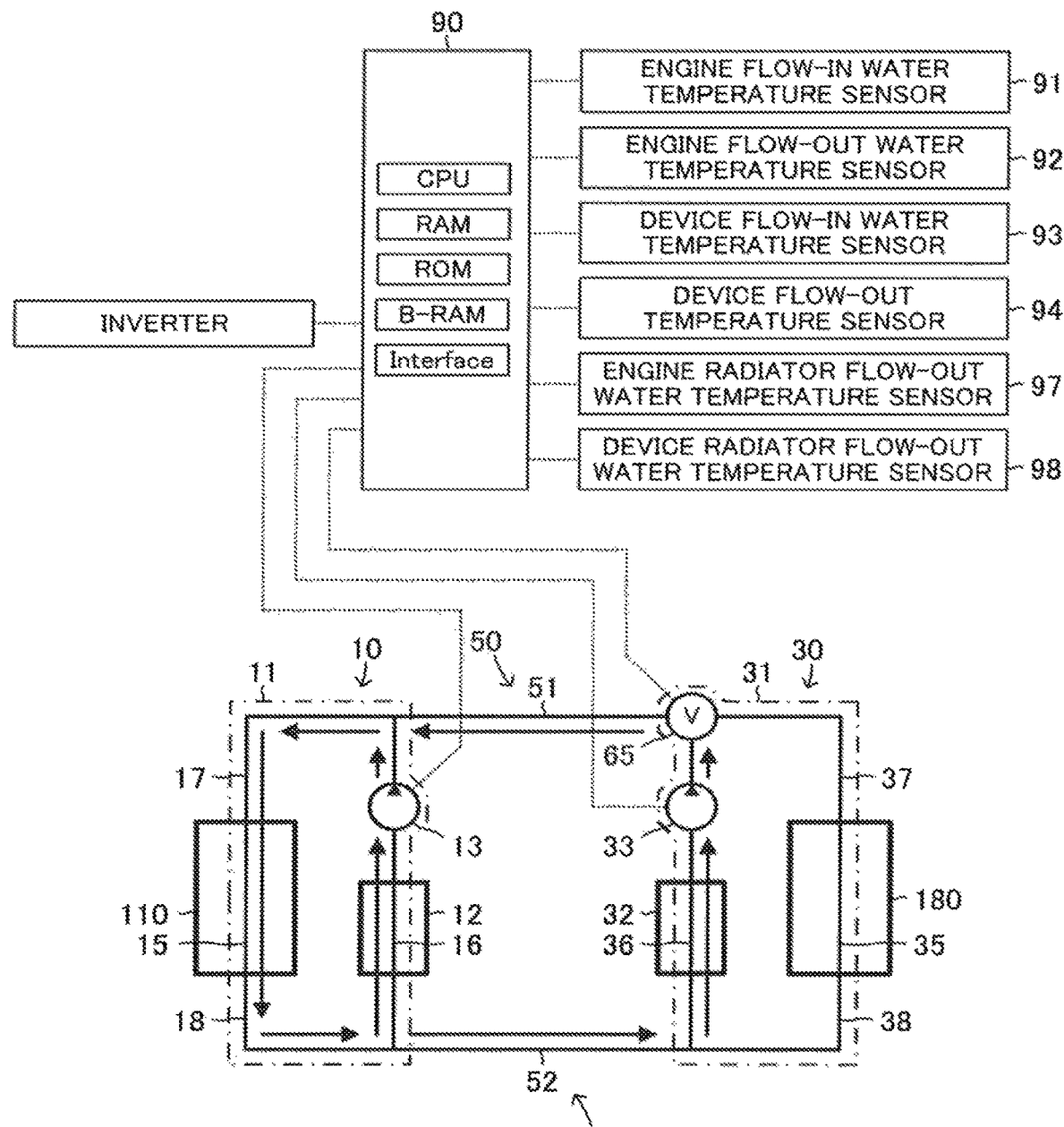
FIG. 4 is a view similar to FIG. 2 and which shows the flow of the heat exchanging water.

Thereby, as shown by arrows in FIG. 4, a part of the heat exchanging water flowing out from the engine passage 15 flows into the engine radiator passage 16 through the second engine circulation passage 18 and is cooled by the engine radiator 12. The remaining of the heat exchanging water flowing out from the engine passage 15 flows into the device radiator passage 36 through the second engine circulation passage 18, the second connection passage 52, and the second device circulation passage 38 and is cooled by the device radiator 32.

The heat exchanging water cooled by the engine radiator 12 is supplied to the engine passage 15 through the first engine circulation passage 17. The heat exchanging water cooled by the device radiator 32 is supplied to the engine passage 15 through the first device circulation passage 37, the first connection passage 51, and the first engine circulation passage 17.

Thereby, the heat exchanging water cooled by the engine radiator 12 and the device radiator 32 is supplied to the engine passage 15. Therefore, the heat exchanging water having a large ability of cooling the engine 110 is supplied to the engine passage 15. Thus, when the engine requested output power Peng is larger than the predetermined output power Peng_th, the engine temperature Teng can be maintained at the temperature equal to or lower than the predetermined upper limit engine temperature Teng_upper.

The embodiment apparatus may be configured to determine whether the engine temperature Teng is higher than the predetermined upper limit engine temperature Teng_upper by determining whether the engine flow-out water temperature Tw_eng_out is higher than a predetermined water temperature Tw_eng_connect. The predetermined water temperature Tw_eng_connect corresponds to the engine flow-out water temperature Tw_eng_out, at which the engine temperature Teng corresponds to the predetermined upper limit engine temperature Teng_upper. The predetermined water temperature Tw_eng_connect is, for example, previously set on the basis of an experiment.

In this case, the embodiment apparatus is configured to determine whether the process for cooling the hybrid device 180 is requested to be executed when the process for cooling the engine 110 is requested to be executed, and the engine flow-out water temperature Tw_eng_out is higher than the predetermined water temperature Tw_eng_connect. In this case, the embodiment apparatus is configured to set the control valve 65 at the connection position and activate the engine pump 13 and the device pump 33 when the process for cooling the hybrid device 180 is requested to be executed.

Further, the embodiment apparatus may be configured to determine whether the engine temperature Teng is higher than the predetermined upper limit engine temperature Teng_upper by determining whether an amount Q of fuel injected from fuel injectors of the engine 110 is larger than a predetermined amount Qth when the process for cooling the engine 110 is requested to be executed. The predetermined amount Qth corresponds to the amount Q of the fuel injected from the fuel injectors when the engine temperature Teng corresponds to the predetermined upper limit engine temperature Teng_upper. The predetermined amount Qth is, for example, previously set on the basis of an experiment.

Concrete Operation of Embodiment Apparatus

Next, a concrete operation of the embodiment apparatus will be described. The CPU of the ECU 90 of the embodiment apparatus is configured or programmed to execute a routine shown by a flowchart in FIG. 5 each time a predetermined time elapses.

Figure 5:
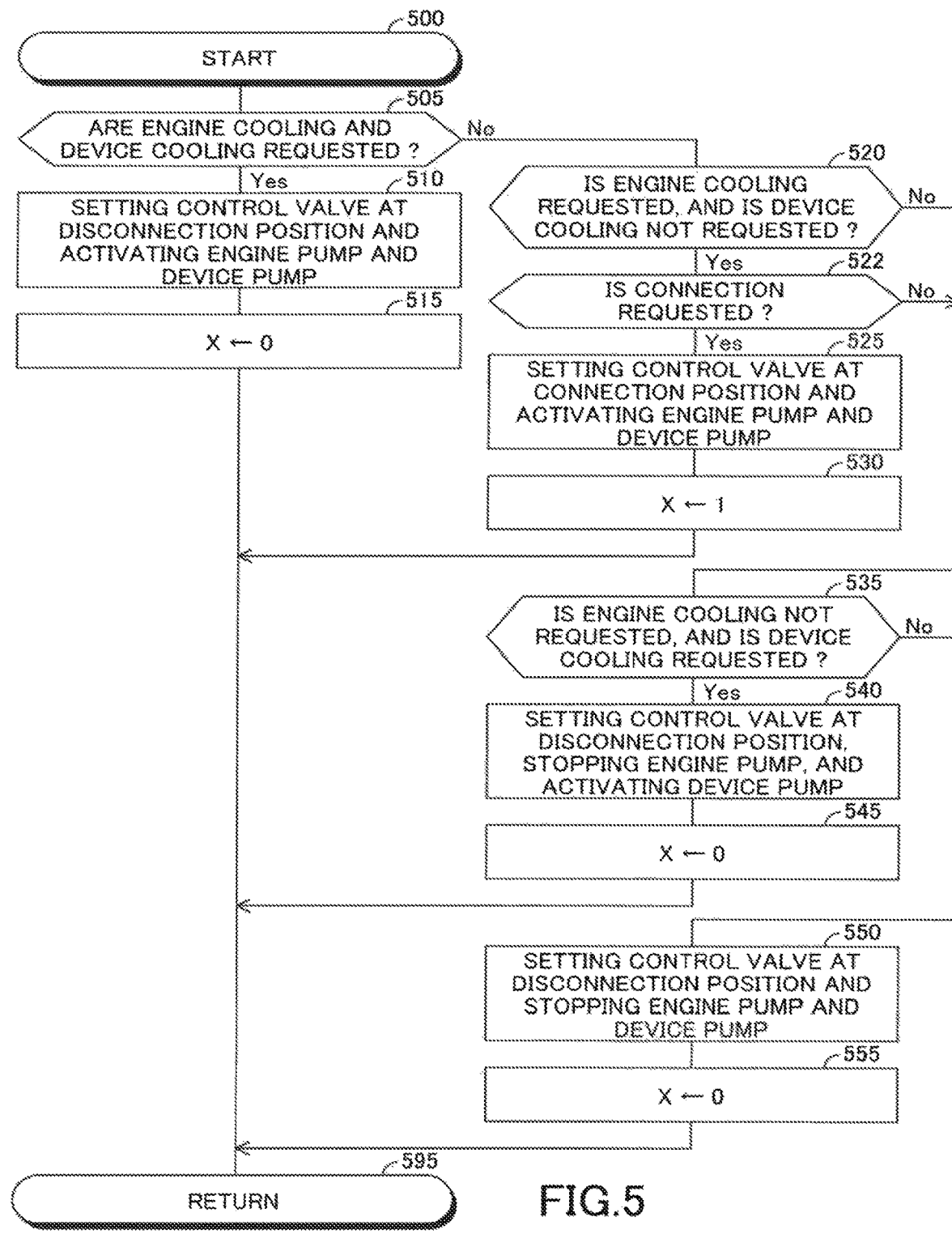
FIG. 5 is a view similar to FIG. 2 and which shows the flow of the heat exchanging water.

Therefore, at a predetermined timing, the CPU starts a process from a step 500 in FIG. 5 and then, proceeds with the process to a step 505 to determine whether the process for cooling the engine 110 and the process for cooling the hybrid device 180 are requested to be executed. When the process for cooling the engine 110 and the process for cooling the hybrid device 180 are requested to be executed, the CPU determines "Yes" at the step 505 and then, sequentially executes processes of steps 510 and 515 described below. Thereafter, the CPU proceeds with the process to a step 595 to terminate this routine once.

Step 510: The CPU sets the control valve 65 at the disconnection position and activates the engine pump 13 and the device pump 33. The CPU controls the activation of the engine pump 13 by controlling a duty ratio Deng of the engine pump 13 to a target pump duty ratio Deng_tgt acquired at a step 840 in FIG. 8. In addition, the CPU controls the activation of the device pump 33 by controlling a duty ratio Ddev of the device pump 33 to a target pump duty ratio Ddev_tgt acquired at a step 880 in FIG. 8.

Step 515: The CPU sets a value of a connection mode flag X to "0". The connection mode flag X represents a set position of the control valve 65. When the value of the connection mode flag X is "0", the connection mode flag X represents that the control valve 65 is set at the disconnection position. When the value of the connection mode flag is "1", the connection mode flag X represents that the control valve 65 is set at the connection position.

When any of the process for cooling the engine 110 and the process for cooling the hybrid device 180 is not requested to be executed at a time of executing a process of the step 505, the CPU determines "No" at the step 505 and then, proceeds with the process to a step 520 to determine whether the process for cooling the engine 110 is requested to be executed, and the process for cooling the hybrid device 180 is not requested to be executed.

When the process for cooling the engine 110 is requested to be executed, and the process for cooling the hybrid device 180 is not requested to be executed, the CPU determines "Yes" at the step 520 and then, proceeds with the process to a step 522 to determine whether a process for connecting the engine circulation circuit 11 to the device circulation circuit 31 is requested to be executed. The CPU determines that the process for connecting the engine circulation circuit 11 to the device circulation circuit 31 is requested to be executed when the engine requested output power Peng is larger than the predetermined output power Peng_th.

When the process for connecting the engine circulation circuit 11 to the device circulation circuit 31 is requested to be executed, the CPU determines "Yes" at the step 522 and then, sequentially executes processes of steps 525 and 530 described below. Thereafter, the CPU proceeds with the process to the step 595 to terminate this routine once.

Step 525: The CPU sets the control valve 65 at the connection position and activates the engine pump 13 and the device pump 33. The CPU controls the activation of the engine pump 13 by controlling the duty ratio Deng of the engine pump 13 to the target pump duty ratio Deng_tgt acquired at a step 785 in FIG. 7. In addition, the CPU controls the activation of the device pump 33 by controlling the duty ratio Ddev of the device pump 33 to the target pump duty ratio Ddev_tgt acquired at a step 785 in FIG. 7.

Step 530: The CPU sets the value of the connection mode flag X to "1".

When the process for connecting the engine circulation circuit 11 to the device circulation circuit 31 is not requested to be executed at a time of executing a process of the step 522, the CPU determines "No" at the step 522 and then, proceeds with the process to a step 535.

Also, when the process for cooling the engine 110 is not requested to be executed, or the process for cooling the hybrid device 180 is requested to be executed at a time of executing a process of the step 520, the CPU determines "No" at the step 520 and then, proceeds with the process to the step 535.

When the CPU proceeds with the process to the step 535, the CPU determines whether the process for cooling the engine 110 is not requested to be executed, and the process for cooling the hybrid device 180 is requested to be executed. When the process for cooling the engine 110 is not requested to be executed, and the process for cooling the hybrid device 180 is requested to be executed, the CPU determines "Yes" at the step 535 and then, sequentially executes processes of steps 540 and 545 described below. Thereafter, the CPU proceeds with the process to the step 595 to terminate this routine once.

Step 540: The CPU sets the control valve 65 at the disconnection position, stops activating the engine pump 13, and activates the device pump 33. The CPU controls the activation of the device pump 33 by controlling the duty ratio Ddev of the device pump 33 to the target pump duty ratio Ddev_tgt acquired at a step 880 in FIG. 8.

Step 545: The CPU sets the value of the connection mode flag X to "0".

When the process for cooling the engine 110 is requested to be executed, or the process for cooling the hybrid device 180 is not requested to be executed at a time of executing a process of the step 535, the CPU determines "No" at the step 535 and then, sequentially executes processes of steps 550 and 555 described below. Therefore, the CPU proceeds with the process to the step 595 to terminate this routine once.

Step 550: The CPU sets the control valve 6S at the disconnection position and stops activating the engine pump 13 and the device pump 33.

Step 555: The CPU sets the value of the connection mode flag X to "0".

When the embodiment apparatus executes the routine shown in FIG. 5 and determines that the engine requested output power Peng is larger than the predetermined output power Peng_th (i.e., determines "Yes" at the step 522), the heat exchanging water cooled by the engine radiator 12 and the device radiator 32 is supplied to the engine passage 15. Thus, the engine temperature Teng can be maintained at the temperature equal to or lower than the predetermined upper limit engine temperature Teng_upper.

Figure 6:
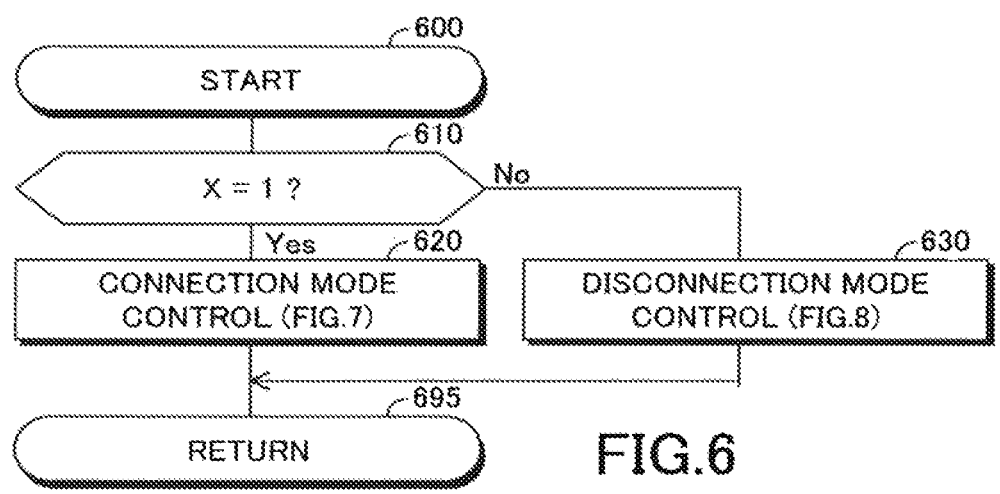
FIG. 6 is a view for showing a routine executed by a CPU of an ECU of the cooling apparatus shown in FIG. 2.

Further, the CPU is configured or programmed to execute a routine shown by a flowchart in FIG. 6 each time a predetermined time elapses. Therefore, at a predetermined timing, the CPU starts a process from a step 500 in FIG. 6 and then, proceeds with the process to a step 610 to determine whether the value of the connection mode flag X is "1".

Figure 7:
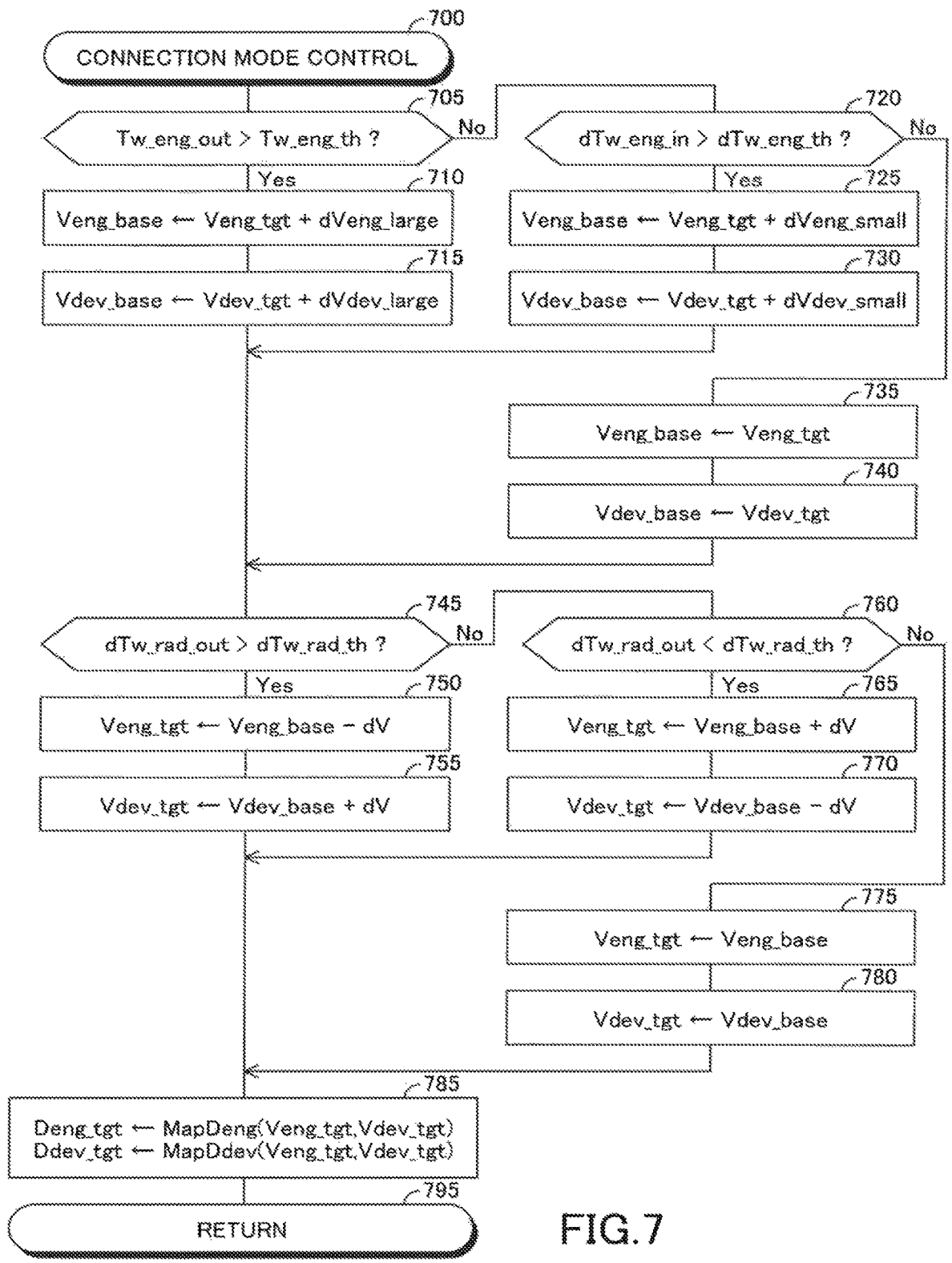
FIG. 7 is a view for showing a routine executed by the CPU.

When the value of the connection mode flag X is "1", the CPU determines "Yes" at the step 610 and then, proceeds with the process to a step 620 to execute a routine shown by a flowchart in FIG. 7.

Therefore, when the CPU proceeds with the process to the step 620, the CPU starts a process from a step 700 in FIG. 7 and then, proceeds with the process to a step 705 to determine whether the engine flow out water temperature Tw_eng_out is higher than a predetermined engine flow-out water temperature Tw_eng_th. In this embodiment, the predetermined engine flow-out water temperature Tw_eng_th is set to an intermediate temperature of the predetermined engine water temperature range Wtw_eng.

When the engine flow-out water temperature Tw_eng_out is higher than the predetermined engine How out water temperature Tw_eng_th, the CPU determines "Yes" at the step 705 and then, sequentially executes processes of steps 710 and 715 described below. Thereafter, the CPU proceeds with the process to a step 745.

Step 710: The CPU acquires a value calculated by adding a predetermined flow rate dVeng_large to the latest target engine radiator flow rate Veng_tgt stored in the RAM of the ECU 90 as a base engine radiator flow rate Veng_base (=Veng_tgt+dVeng_large).

Step 715: The CPU acquires a value calculated by adding a predetermined flow rate dVdev_large to the latest target device radiator flow rate Vdev_tgt stored in the RAM of the ECU 90 as a base device radiator flow rate Vdev_base (=Vdev_tgt+dvdev_large).

When the engine flow out water temperature Tw_eng_out is higher than the predetermined engine flow-out water temperature Tw_eng_th at a time of executing a process of the step 705, the CPU determines "No" at the step 705 and then, proceeds with the process to a step 720 to acquire a value calculated by subtracting a reference water temperature Tw_eng_ref from the engine flow-in water temperature Tw_eng_in as an engine flow-in water temperature difference dTw_eng_in (=Tw_eng_in−Tw_eng_ref) and determine whether the engine flow-in water temperature difference dTw_eng_in is larger than a predetermined difference dTw_eng_th.

The reference water temperature Tw_eng_ref corresponds to the temperature of the heat exchanging water suitable as the temperature of the heat exchanging water supplied to the engine passage 15 for maintaining the engine temperature Teng within the predetermined engine temperature range Weng. The reference water temperature Tw_eng_ref is, for example, previously set on the basis of an experiment. The predetermined difference dTw_eng_th corresponds to an upper limit of the engine flow-in water temperature difference dTw_eng_in suitable for maintaining the engine temperature Teng within the predetermined engine temperature range Weng. The predetermined difference dTw_eng_th is, for example, previously set on the basis of an experiment.

When the engine flow-in water temperature difference dTw_eng_in is larger than the predetermined difference dTw_eng_th, the CPU determines "Yes" at the step 720 and then, sequentially executes processes of steps 725 and 730 described below. Thereafter, the CPU proceeds with the process to the step 745.

Step 725: The CPU acquires a value calculated by adding a predetermined flow rate dVeng_small to the latest target engine radiator flow rate Veng_tge stored in the RAM of the ECU 90 as a base engine radiator flow rate Veng_base (=Veng_tgt+dVeng_small). In this embodiment, the predetermined flow rate dVeng_small is smaller than the predetermined flow rate dVeng_large.

Step 730: The CPU acquires a value calculated by adding a predetermined flow rate dVdev_small to the latest target device radiator flow rate Vdev_tge stored in the RAM of the ECU 90 as a base device radiator flow rate Vdev_base (=Vdev_tgt+dVdev_small). In this embodiment, the predetermined flow rate dVdev_small is smaller than the predetermined flow rate dVdev_large.

When the engine flow-in water temperature difference dTw_eng_in is equal to or smaller than the engine flow-in water temperature difference dTw_eng_in at a time of executing a process of the step 720, the CPU determines "No" at the step 720 and then, sequentially executes processes of steps 735 and 740. Thereafter, the CPU proceeds with the process to the step 745.

Step 735: The CPU acquires the latest target engine radiator flow rate Veng_tgt stored in the RAM of the ECU 90 as the base engine radiator flow rate Veng_base.

Step 740: The CPU acquires the latest target device radiator flow rate Vdev_tgt stored in the RAM of the ECU 90 as the base device radiator flow rate Vdev_base.

When the CPU proceeds with the process to the step 745, the CPU acquires a value calculated by subtracting the device radiator flow-out water temperature Tw_dev_rad from the engine radiator flow-out water temperature Tw_eng_rad as a radiator flow-out water temperature difference dTw_rad_out (=Tw_eng_rad−Tw_dev_rad) and determines whether the radiator flow-out water temperature difference dTw_rad_out is larger than a predetermined difference dTw_rad_th.

The predetermined difference dTw_rad_th corresponds to the radiator flow out water temperature difference dTw_rad_out permitted for controlling the engine radiator flow-out water temperature Tw_eng_rad and the device radiator flow-out water temperature Tw_dev_rad to be equal to each other. The predetermined difference dTw_rad_th is, for example, previously set on the basis of an experiment.

When the radiator flow-out water temperature difference dTw_rad_out is larger than the predetermined difference dTw_rad_th, the CPU determines "Yes" at the step 745 and then, sequentially executes processes of steps 750, 755, and 785 described below. Thereafter, the CPU proceeds with the process to a step 695 in FIG. 6 via a step 795 to terminate this routine once.

Step 750: The CPU acquires a value calculated by subtracting a predetermined flow rate dV from the base engine radiator flow rate Veng_base as the target engine radiator flow rate Veng_tgt (=Veng_base−dV).

Step 755: The CPU acquires a value calculated by adding the predetermined flow rate dV to the base device radiator flow rate Vdev_base as the target device radiator flow rate Vdev_tgt (=Vdev_base+dV).

Step 785: The CPU applies the target engine radiator flow rate Veng_tgt acquired at the step 750 and the target device radiator flow rate Vdev_tgt acquired at the step 755 to a look-up table MapDeng(Veng_tgt, Vdev_tgt) to acquire the target pump duty ratio Deng_tgt. In addition, the CPU applies the target engine radiator flow rate Veng_tgt acquired at the step 750 and the target device radiator flow rate Vdev_tgt acquired at the step 755 to a look-up table MapDdev(Veng_tgt, Vdev_tgt) to acquire the target pump duty ratio Ddev_tgt.

The target pump duty ratio Deng_tgt acquired from the look-up table MapDeng(Veng_tgt, Vdev_tgt) increases as the target engine radiator flow rate Veng_tgt increases. The target pump duty ratio Deng_tgt acquired from the look-up table MapDeng(Veng_tgt, Vdev_tgt) decreases as the target device radiator flow rate Vdev_tgt increases.

The target pump duty ratio Ddev_tgt acquired from the look-up table MapDdev(Veng_tgt, Vdev_tgt) decreases as the target engine radiator flow rate Veng_tgt increases. The target pump duty ratio Ddev_tgt acquired from the look-up table MapDdev(Veng_tgt, Vdev_tgt) increases as the target device radiator flow rate Vdev_tgt increases.

When the radiator flow-out water temperature difference dTw_rad_out is equal to or smaller than the predetermined difference dTw_rad_th at a time of executing a process of the step 745, the CPU determines "No" at the step 745 and then, proceeds with the process to a step 760 to determine whether the radiator flow-out water temperature difference dTw_rad_out is smaller than the predetermined difference dTw_rad_th.

When the radiator flow-out water temperature difference dTw_rad_out is smaller than the predetermined difference dTw_rad_th, the CPU determines "Yes" at the step 760 and then, sequentially executes processes of steps 765 and 770 described below and the process of the step 785 described above. Thereafter, the CPU proceeds with the process to the step 695 in FIG. 6 via the step 795 to terminate this routine once.

Step 765: The CPU acquires a value calculated by adding the predetermined flow rate dV to the base engine radiator flow rate Veng_base as the target engine radiator flow rate Veng_tgt (=Veng_base+dV).

Step 770: The CPU acquires a value calculated by subtracting the predetermined flow rate dV from the base device radiator flow rate Vdev_base as the target device radiator flow rate Vdev_tgt (=Vdev_base−dV).

In this case, at the step 785, the CPU acquires the target pump duty ratio Deng_tgt and the target pump duty ratio Ddev_tgt by using the target engine radiator flow rate Veng_tgt acquired at the step 765 and the target device radiator flow rate Vdev_tgt acquired at the step 770.

When the radiator flow-out water temperature difference dTw_rad_out is equal to or larger than the predetermined difference dTw_rad_th at a time of executing a process of the step 760, the CPU determines "No" at the step 760 and then, sequentially executes processes of steps 775 and 780 described below and the process of the step 785 described above. Thereafter, the CPU proceeds with the process to the step 695 in FIG. 6 via the step 795 to terminate this routine once.

Step 775: The CPU acquires the base engine radiator flow rate Veng_base as the target engine radiator flow rate Veng_tgt.

Step 770: The CPU acquires the base device radiator flow rate Vdev_base as the target device radiator flow rate Vdev_tgt.

In this case, at the step 785, the CPU acquires the target pump duty ratio Deng_tgt and the target pump duty ratio Ddev_tgt by using the target engine radiator flow rate Veng_tgt acquired at the step 775 and the target device radiator flow rate Vdev_tgt acquired at the step 780.

Figure 8:
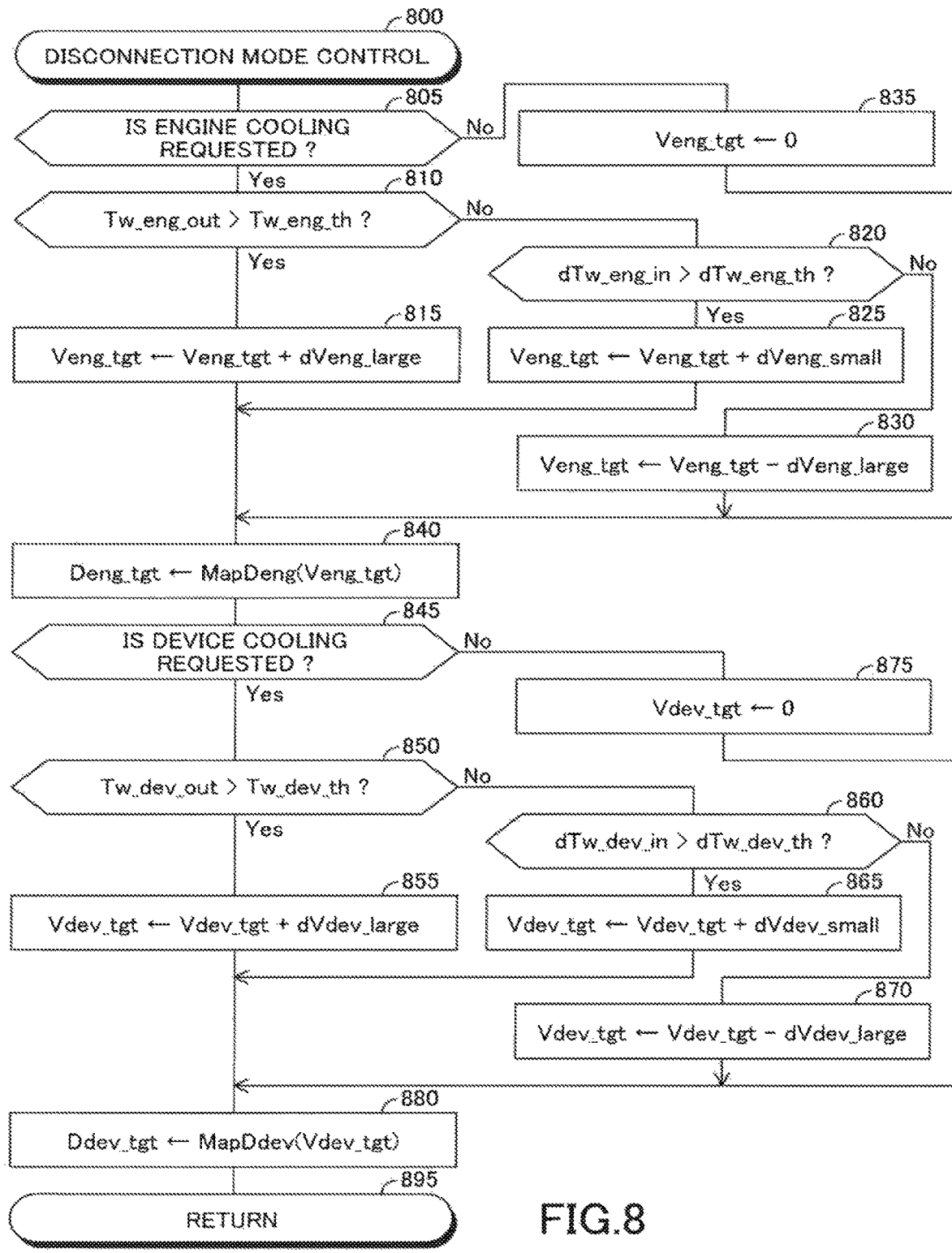
FIG. 8 is a view for showing a routine executed by the CPU.

Referring to FIG. 6, when the value of the connection mode flag X is "0" at a time of executing a process of the step 610, the CPU determines "No" at the step 610 and then, proceeds with the process to a step 630 to execute a routine shown by a flowchart in FIG. 8.

Therefore, when the CPU proceeds with the process to the step 630, the CPU starts a process from a step 800 and then, proceeds with the process to a step 805 to determine whether the process for cooling the engine 110 is requested to be executed. When the process for cooling the engine 110 is requested to be executed, the CPU determines "Yes" at the step 805 and then, proceeds with the process to a step 810 to determine whether the engine flow-out water temperature Tw_eng_out is higher than the predetermined engine flow-out water temperature Tw_eng_th.

When the engine flow-out water temperature Tw_eng_out is higher than the predetermined engine flow-out water temperature Tw_eng_th, the CPU determines "Yes" at the step 810 and then, sequentially executes processes of steps 815 and 840 described below. Thereafter, the CPU proceeds with the process to a step 845.

Step 815: The CPU acquires a value calculated by adding the predetermined flow rate dVeng_large to the latest target engine radiator flow rate Veng_tgt stored in the RAM of the ECU 90 as the target engine radiator flow rate Veng_tgt (=Veng_tgt+dVeng_large).

Step 840: The CPU applies the target engine radiator flow rate Veng_tgt acquired at the step 815 to a look-up table MapDeng(Veng_tgt) to acquire the target pump duty ratio Deng_tgt. The target pump duty ratio Deng_tgt acquired from the look-up table MapDeng(Veng_tgt) increases as the target engine radiator flow rate Veng_tgt increases.

When the engine flow-out water temperature Tw_eng_out is equal to or higher than the predetermined engine flow-out water temperature Tw_eng_th at a time of executing a process of the step 810, the CPU determines "No" at the step 810 and then, proceeds with the process to a step 820 to acquire a value calculated by subtracting the reference water temperature Tw_eng_ref from the engine flow in water temperature Tw_eng_in as the engine flow-in water temperature difference dTw_eng_in (=Tw_eng_in−Tw_eng_ref) and determines whether the engine flow-in water temperature difference dTw_eng_in is larger than the predetermined difference dTw_eng_th.

When the engine flow-in water temperature difference dTw_eng_in is larger than the predetermined difference dTw_eng_th, the CPU determines "Yes" at the step 820 and then, executes a process of a step 825 described below and the process of the step 840 described above. Thereafter, the CPU proceeds with the process to the step 845.

Step 825: The CPU acquires a value calculated by adding the predetermined flow rate dVeng_small to the latest target engine radiator flow rate Veng_tgt stored in the RAM of the ECU 90 as the target engine radiator flow rate Veng_tgt (=Veng_tgt+dVeng_small).

In this case, at the step 840, the CPU acquires the target pump duty ratio Deng_tgt by using the target engine radiator flow rate Veng_tgt acquired at the step 825.

When the engine flow-in water temperature difference dTw_eng_in is equal to or smaller than the predetermined difference dTw_eng_th at a time of executing a process of the step 820, the CPU determines "No" at the step 820 and then, executes a process of a step 830 described below and the process of the step 840 described above. Thereafter, the CPU proceeds with the process to the step 845.

Step 830: The CPU acquires a value calculated by subtracting the predetermined flow rate dVeng_large from the latest target engine radiator flow rate Veng_tgt stored in the RAM of the ECU 90 as the target engine radiator flow rate Veng_tgt (=Veng_tgt−dVeng_large).

In this case, at the step 840, the CPU acquires the target pump duty ratio Deng_tgt by using the target engine radiator flow rate Veng_tgt acquired at the step 830.

When the process for cooling the engine 110 is not requested to be executed at a time of executing a process of the step 805, the CPU determines "No" at the step 805 and then, executes a process of a step 835 described below and the process of the step 840 described above. Thereafter, the CPU proceeds with the process to the step 845.

Step 835: The CPU sets the target engine radiator flow rate Veng_tgt to zero.

In this case, at the step 840, the CPU acquires the target pump duty ratio Deng_tgt by using the target engine radiator flow rate Veng_tgt acquired at the step 835. The acquired target engine pump duty ratio Deng_tgt is zero.

When the CPU proceeds with the process to the step 845, the CPU determines whether the process for cooling the hybrid device 180 is requested to be executed. When the process for cooling the hybrid device 180 is requested to be executed, the CPU determines "Yes" at the step 845 and then, proceeds with the process to a step 850 to determine whether the device flow-out water temperature Tw_dev_out is higher than a predetermined device flow-out water temperature Tw_dev_th. In this embodiment, the predetermined device flow-out water temperature Tw_dev_th is set to an intermediate temperature of the predetermined device water temperature range Wtw_dev.

When the device flow-out water temperature Tw_dev_out is higher than the predetermined device flow-out water temperature Tw_dev_th, the CPU determines "Yes" at the step 850 and then, sequentially executes processes of steps 855 and 880 described below. Thereafter, the CPU proceeds with the process to the step 695 in FIG. 6 via a step 895 to terminate this routine once.

Step 855: The CPU acquires a value calculated by adding the predetermined flow rate dvdev_large to the latest target device radiator flow rate Vdev_tgt stored in the RAM of the ECU 90 as the target device radiator flow rate Vdev_tgt (=Vdev_tgt+dvdev_large).

Step 880: The CPU applies the target device radiator flow rate Vdev_tgt acquired at the step 855 to a look-up table MapDdev(Vdev_tgt) to acquire the target pump duty ratio Odev_tgt. The target pump duty ratio Odev_tgt acquired from the look-up table MapDdev(Vdev_tgt) increases as the target device radiator flow rate Vdev_tgt increases.

When the device flow-out water temperature Tw_dev_out is equal to or lower than the predetermined device flow-out water temperature Tw_dev_th at a time of executing a process of the step 850, the CPU determines "No" at the step 850 and then, proceeds with the process to a step 860 to acquire a value calculated by subtracting a reference water temperature Tw_dev_ref from the device flow-in water temperature Tw_dev_in as a device flow-in water temperature difference dTw_dev_in (=Tw_dev_in−Tw_dev_ref) and determines whether the device flow-in water temperature difference dTw_dev_in is larger than a predetermined difference dTw_dev_th.

The predetermined difference dTw_dev_th corresponds to an upper limit of the device flow-in water temperature difference dTw_dev_in suitable for maintaining the device temperature Tdev within the predetermined device temperature range Wdev. The predetermined difference dTw_dev_th is, for example, previously set on the basis of an experiment.

When the device flow-in water temperature difference dTw_dev_in is larger than the predetermined difference dTw_dev_th, the CPU determines "Yes" at the step 860 and then, executes a process of a step 865 described below and the process of the step 880 described above. Thereafter, the CPU proceeds with the process to the step 695 in FIG. 6 via the step 895 to terminate this routine once.

Step 865: The CPU acquires a value calculated by adding the predetermined flow rate dVdev_small to the latest target device radiator flow rate Vdev_tgt stored in the RAM of the ECU 90 as the target device radiator flow rate Vdev_tgt (=Vdev_tgt+dVdev_small).

In this case, at the step 880, the CPU acquires the target pump duty ratio Ddev_tgt by using the target device radiator flow rate Vdev_tgt acquired at the step 865.

When the device flow-in water temperature difference dTw_dev_in is equal to or smaller than the predetermined difference dTw_dev_th at a time of executing a process of the step 860, the CPU determines "No" at the step 860 and then, executes a process of a step 870 described below and the process of the step 880 described above. Thereafter, the CPU proceeds with the process to the step 695 in FIG. 6 via the step 895 to terminate this routine once.

Step 870: The CPU acquires a value calculated by subtracting the predetermined flow rate dVdev_large from the latest target device radiator flow rate Vdev_tgt stored in the RAM of the ECU 90 as the target device radiator flow rate Vdev_tgt (=Vdev_tgt−dvdev_large).

In this case, at the step 880, the CPU acquires the target pump duty ratio Ddev_tgt by using the target device radiator flow rate Vdev_tgt acquired at the step 870.

When the process for cooling the hybrid device 180 is not requested to be executed at a time of executing a process of the step 845, the CPU determines "No" at the step 845 and then, executes a process of a step 875 described below and the process of the step 880 described above. Thereafter, the CPU proceeds with the process to the step 695 in FIG. 6 via the step 895 to terminate this routine once.

Step 875: The CPU sets the target device radiator flow rate Vdev_tgt to zero.

In this case, at the step 880, the CPU acquires the target pump duty ratio Ddev_tgt by using the target device radiator flow rate Vdev_tgt acquired at the step 875. The acquired target device pump duty ratio Ddev_tgt is zero.

When the embodiment apparatus executes the routine shown in FIG. 7, the flow rates of the heat exchanging water discharged from the engine pump 13 and the device pump 33 are controlled in response to the engine flow-out water temperature Tw_eng_out (that is, the engine temperature Teng), the engine flow-in water temperature difference dTw_eng_in (that is, the engine flow-in water temperature Tw_eng_in), and the radiator flow-out water temperature difference dTw_rad_out (that is, the engine radiator flow-out water temperature Tw_eng_rad and the device radiator flow-out water temperature Tw_dev_rad). Thus, the engine temperature Teng can be surely controlled to the temperature equal to or lower than the predetermined upper limit engine temperature Teng_upper when the engine 110 is cooled by the heat exchanging water cooled by the engine radiator 12 and the device radiator 32.

Further, when the embodiment apparatus executes the routine shown in FIG. 8, the flow rate of the heat exchanging water discharged from the engine pump 13 is controlled in response to the engine flow-out water temperature Tw_eng_out (that is, the engine temperature Teng) and the engine flow-in water temperature difference dTw_eng_in (that is, the engine flow-in water temperature Tw_eng_in). Thus, the engine temperature Teng can be surely controlled to the temperature within the predetermined engine temperature range Weng when the engine 110 is cooled by the heat exchanging water cooled only by the engine radiator 12.

Further, when the embodiment apparatus executes the routine shown in FIG. 8, the flow rate of the heat exchanging water discharged from the device pump 33 is controlled in response to the device flow-out water temperature Tw_dev_out (that is, the device temperature Tdev) and the device flow-in water temperature difference dTw_dev_in (that is, the device flow-in water temperature Tw_dev_in). Thus, the device temperature Tdev can be surely controlled to the temperature within the predetermined device temperature range Wdev when the hybrid device 180 is cooled by the heat exchanging water cooled by the device radiator 32.

In this embodiment, the engine flow rate Veng to be set as a target when the process for cooling the engine 110 is requested to be executed, is acquired by an experiment and the like and is stored as an initial engine radiator flow rate Veng_initial in the ROM of the ECU 90. The CPU uses the Initial engine radiator flow rate Veng_initial stored in the ROM as the target engine radiator flow rate Veng_tgt at a point of time of requesting to execute the process for cooling the engine 110 when the engine 110 is requested to operate after the operation of the engine 110 stops.

In this embodiment, the device flow rate Vdev to be set as a target when the process for cooling the hybrid device 180 is requested to be executed, is acquired by an experiment and the like and is stored as an initial device radiator flow rate Vdev_initial in the ROM of the ECU 90. The CPU uses the initial device radiator flow rate Vdev_initial stored in the ROM as the target device radiator flow rate Vdev_tgt at a point of time of requesting to execute the process for cooling the hybrid device 180 when the hybrid device 180 is requested to activate after the activation of the hybrid device 180 stops.

It should be noted that the present invention is not limited to the aforementioned embodiment, and various modifications can be employed within the scope of the present invention.

The embodiment apparatus activates the engine pump 13 and the device pump 33 when the embodiment apparatus sets the control valve 65 at the connection position, thereby connecting the engine circulation circuit 11 to the device radiator 32. In this regard, the embodiment apparatus may be configured to activate one of the engine pump 13 and the device pump 33 when the embodiment apparatus sets the control valve 65 at the connection position, thereby connecting the engine circulation circuit 11 to the device radiator 32.

Further, the embodiment apparatus supplies to the engine passage 15, the heat exchanging water flowing through the engine radiator passage 16 and the heat exchanging water flowing through the device radiator passage 36 in parallel when the embodiment apparatus sets the control valve 65 at the connection position, thereby connecting the engine circulation circuit 11 to the device circulation circuit 31. In this regard, the embodiment apparatus may be configured to supply to the engine passage 15, the heat exchanging water flowing through the engine radiator passage 16 and the device radiator passage 36 in series when the embodiment apparatus sets the control valve 65 at the connection position, thereby connecting the engine circulation circuit 11 to the device circulation circuit 31.

Further, the connection apparatus of the embodiment apparatus may be any of apparatuses which can connect the engine circulation circuit 11 to the device circulation circuit 31 such that the heat exchanging water flows through the engine passage 15 after the heat exchanging water flows through the device radiator passage 36 without flowing through the device passage 35.

What is claimed is:

1. A cooling apparatus of a vehicle comprising:
an engine cooling system including an engine circulation circuit, in which a heat exchanging liquid for cooling an internal combustion engine of the vehicle flows, an engine pump provided in the engine circulation circuit, and an engine radiator provided in the engine circulation circuit for cooling the heat exchanging liquid, the engine circulation circuit including an engine passage formed in the internal combustion engine;
a device cooling system including a device circulation circuit, in which the heat exchanging liquid for cooling a device of the vehicle flows, a device pump provided in the device circulation circuit, and a device radiator provided in the device circulation circuit for cooling the heat exchanging liquid, the device circulation circuit including a device passage formed in the device, the device including at least one of a motor of the vehicle, a battery for storing electric power to be supplied to the motor, and a power control unit for controlling a supply of the electric power from the battery to the motor; and
a connection apparatus that connects the engine circulation circuit and the device circulation circuit to each other,
wherein the connection apparatus is configured to connect the engine circulation circuit and the device circulation circuit to each other such that the heat exchanging liquid cooled by the device radiator is supplied to the engine passage without flowing through the device passage,
wherein the cooling apparatus further comprises an electronic control unit for controlling activations of the engine pump, the device pump, and the connection apparatus, and
the electronic control unit is configured to activate the connection apparatus to connect the engine circulation circuit and the device circulation circuit to each other and activate at least one of the engine pump and the device pump when a temperature of the internal combustion engine is higher than a predetermined upper limit engine temperature while the internal combustion engine is requested to be cooled, and the device is not requested to be cooled.

2. The cooling apparatus of the vehicle as set forth in claim 1, wherein the device circulation circuit includes a device radiator passage, through which the heat exchanging liquid flows, formed in the device radiator, a first device circulation passage which connects a first opening of the device passage to a first opening of the device radiator passage, and a second device circulation passage which connects a second opening of the device radiator passage to a second opening of the device passage, and
the connection apparatus includes a first connection passage which connects the engine circulation circuit to the first device circulation passage, a second connection passage which connects the engine circulation circuit to the second device circulation passage, and a control valve for shutting off a flow of the heat exchanging liquid between the device passage and the device radiator passage through at least one of the first device circulation passage and the second device circulation passage.

3. The cooling apparatus of the vehicle as set forth in claim 1, wherein the connection apparatus is configured to connect the engine circulation circuit and the device circulation circuit to each other such that the heat exchanging liquid flows through the engine radiator and the device radiator in parallel.

4. The cooling apparatus of the vehicle as set forth in claim 1, wherein the electronic control unit is configured to activate the connection apparatus to disconnect the engine circulation circuit from the device circulation circuit and activate the engine pump and the device pump when the internal combustion engine is requested to be cooled, and the device is requested to be cooled.

5. The cooling apparatus of the vehicle as set forth in claim 1, wherein the electronic control unit is configured to control the activation of an activated pump of the engine pump and the device pump so as to increase a flow rate of the heat exchanging liquid discharged from the activated pump when a temperature of the heat exchanging liquid flowing out from the engine passage is higher than a predetermined engine flow-out liquid temperature while the electronic control unit connects the engine circulation circuit and the device circulation circuit to each other and activates at least one of the engine pump and the device pump.

6. The cooling apparatus of the vehicle as set forth in claim 5, wherein the electronic control unit is configured to control the activation of the activated pump so as to increase the flow rate of the heat exchanging liquid flowing out from the activated pump when an engine flow-in liquid temperature, which is a temperature of the heat exchanging liquid flowing into the engine passage, is lower than a predetermined engine flow-in liquid temperature, and a difference of the engine flow-in liquid temperature with respect to the predetermined engine flow-in liquid temperature is larger than a predetermined engine flow-in liquid temperature difference while the electronic control unit connects the engine circulation circuit and the device circulation circuit to each other and activates at least one of the engine pump and the device pump.

7. The cooling apparatus of the vehicle as set forth in claim 6, wherein the electronic control unit is configured to control the activation of the activated pump so as to maintain the flow rate of the heat exchanging liquid flowing out from the activated pump when the engine flow-in liquid temperature is lower than the predetermined engine flow-in liquid temperature, and the difference of the engine flow-in liquid temperature with respect to the predetermined engine flow-in liquid temperature is equal to or smaller than the predetermined engine flow-in liquid temperature difference while the electronic control unit connects the engine circulation circuit and the device circulation circuit to each other and activates at least one of the engine pump and the device pump.

8. A cooling apparatus of a vehicle comprising:
an engine cooling system including an engine circulation circuit, in which a heat exchanging liquid for cooling an internal combustion engine of the vehicle flows, an engine pump provided in the engine circulation circuit, and an engine radiator provided in the engine circulation circuit for cooling the heat exchanging liquid, the engine circulation circuit including an engine passage formed in the internal combustion engine;
a device cooling system including a device circulation circuit, in which the heat exchanging liquid for cooling a device of the vehicle flows, a device pump provided in the device circulation circuit, and a device radiator provided in the device circulation circuit for cooling the heat exchanging liquid, the device circulation circuit including a device passage formed in the device, the device including at least one of a motor of the vehicle, a battery for storing electric power to be supplied to the motor, and a power control unit for controlling a supply of the electric power from the battery to the motor;

a connection apparatus that connects the engine circulation circuit and the device circulation circuit to each other, wherein the connection apparatus is configured to connect the engine circulation circuit and the device circulation circuit to each other such that the heat exchanging liquid cooled by the device radiator is supplied to the engine passage without flowing through the device passage; and an electronic control unit for controlling activations of the engine pump, the device pump, and the connection apparatus, and the electronic control unit is configured to:

activate the connection apparatus to connect the engine circulation circuit and the device circulation circuit to each other and activate both of the engine pump and the device pump when the temperature of the internal combustion engine is higher than the predetermined upper limit engine temperature while the internal combustion engine is requested to be cooled, and the device is not requested to be cooled;

control the activations of the engine pump and the device pump so as to decrease a flow rate of the heat exchanging liquid discharged from the engine pump and increase a flow rate of the heat exchanging liquid discharged from the device pump when an engine radiator flow-out liquid temperature, which is a temperature of the heat exchanging liquid flowing out from the engine radiator, is higher than a device radiator flow-out liquid temperature, which is a temperature of the heat exchanging liquid flowing out from the device radiator, and a radiator flow-out liquid temperature difference, which is a difference of the engine radiator flow-out liquid temperature with respect to the device radiator flow-out liquid temperature, is larger than a predetermined radiator flow-out liquid temperature difference while the electronic control unit connects the engine circulation circuit and the device circulation circuit to each other and activates both of the engine pump and the device pump;

control the activations of the engine pump and the device pump so as to increase the flow rate of the heat exchanging liquid discharged from the engine pump and decrease the flow rate of the heat exchanging liquid discharged from the device pump when the engine radiator flow-out liquid temperature is higher than the device radiator flow-out liquid temperature, and the radiator flow-out liquid temperature difference is equal to or smaller than the predetermined radiator flow-out liquid temperature difference while the electronic control unit connects the engine circulation circuit and the device circulation circuit to each other and activates both of the engine pump and the device pump; and control the activations of the engine pump and the device pump so as to increase the flow rate of the heat exchanging liquid discharged from the engine pump and decrease the flow rate of the heat exchanging liquid discharged from the device pump when the engine radiator flow-out liquid temperature is equal to or lower than the device radiator flow-out liquid temperature while the electronic control unit connects the engine circulation circuit and the device circulation circuit to each other and activates both of the engine pump and the device pump.

\* \* \* \* \*